United States Patent
Rudduck et al.

(10) Patent No.: US 8,333,529 B2
(45) Date of Patent: *__Dec. 18, 2012__

(54) STRIP FASTENER

(75) Inventors: Dickory Rudduck, Chicago, IL (US); Lee David Blattmann, Castle Cove (AU); Geoffrey David Sizer, Chicago, IL (US)

(73) Assignee: Telezygology, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,418

(22) Filed: Mar. 6, 2011

(65) Prior Publication Data

US 2011/0150560 A1    Jun. 23, 2011

(51) Int. Cl.
*F16B 9/02*    (2006.01)

(52) U.S. Cl. .......... 403/316; 403/252; 403/28; 403/331; 411/909

(58) Field of Classification Search .................. 411/909; 403/28, 315–319, 252–255, 264, 331, DIG. 10, 403/289

See application file for complete search history.

(56) References Cited

U.S. PATENT DOCUMENTS

| | | | | |
|---|---|---|---|---|
| 4,453,449 A * | 6/1984 | Hollmann | .................... | 89/1.806 |
| 4,799,819 A * | 1/1989 | Swoboda | .................... | 403/252 |
| 4,841,100 A * | 6/1989 | Ignasiak | .................... | 174/138 G |
| 4,974,987 A * | 12/1990 | Smock | .................... | 403/252 |
| 5,209,598 A * | 5/1993 | Zullig | .................... | 403/255 |
| 5,241,451 A * | 8/1993 | Walburn et al. | .................... | 361/785 |
| 6,106,183 A * | 8/2000 | Strassle et al. | .................... | 403/252 |
| 7,017,345 B2 * | 3/2006 | Von Behrens et al. | .................... | 60/527 |
| 7,217,059 B1 * | 5/2007 | Rudduck | .................... | 403/324 |
| 7,600,301 B2 * | 10/2009 | Rudduck et al. | .................... | 24/606 |
| 7,854,580 B2 * | 12/2010 | Rudduck et al. | .................... | 411/511 |
| 7,922,415 B2 * | 4/2011 | Rudduck et al. | .................... | 403/316 |
| 2004/0104580 A1 * | 6/2004 | Spiessl et al. | .................... | 292/84 |
| 2005/0172462 A1 * | 8/2005 | Rudduck et al. | .................... | 24/606 |
| 2009/0180829 A1 * | 7/2009 | Rejman et al. | .................... | 403/331 |

FOREIGN PATENT DOCUMENTS

| | | |
|---|---|---|
| EP | 1447502 | 7/2005 |
| WO | WO99/47819 | 9/1999 |
| WO | WO2004/033925 | 4/2004 |

* cited by examiner

*Primary Examiner* — Joshua Kennedy
(74) *Attorney, Agent, or Firm* — Heather A. Kartsounes

(57) ABSTRACT

A fastener (10) is adapted to releasably fix a first element (12) and a second element (14). The fastener (10) includes a channel (22) having a plurality of spaced lockers (28). The lockers (28) are movable into the channel (22). The fastener (10) also has a locking tongue (30), having a plurality of spaced blockers (32). The tongue (30) is movable within the channel (22) between a locked position in which the blockers (32) prevent movement of the lockers (28) into the channel (22) and an unlocked position in which the lockers (28) are not prevented from moving into the channel (22).

7 Claims, 17 Drawing Sheets

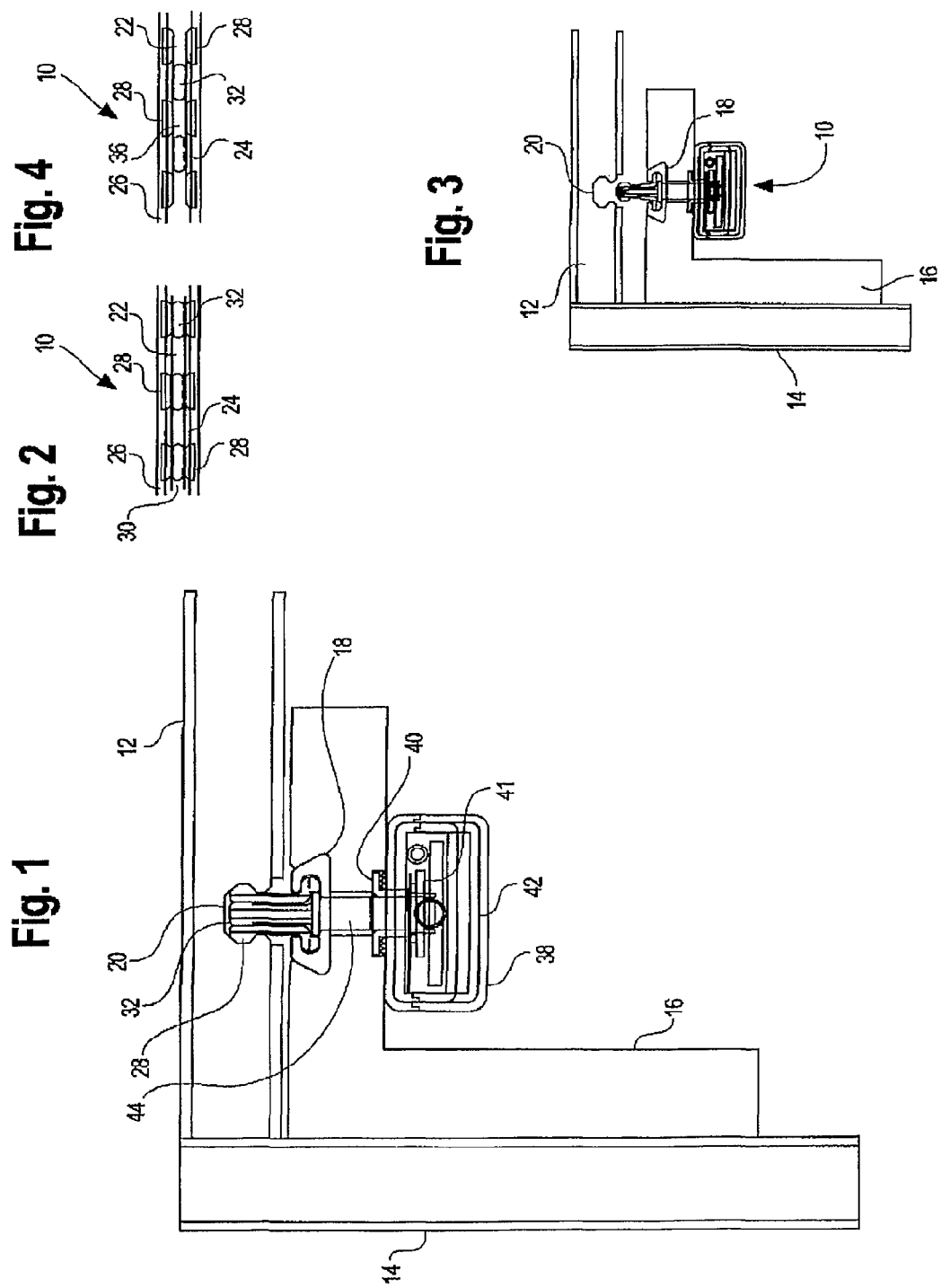

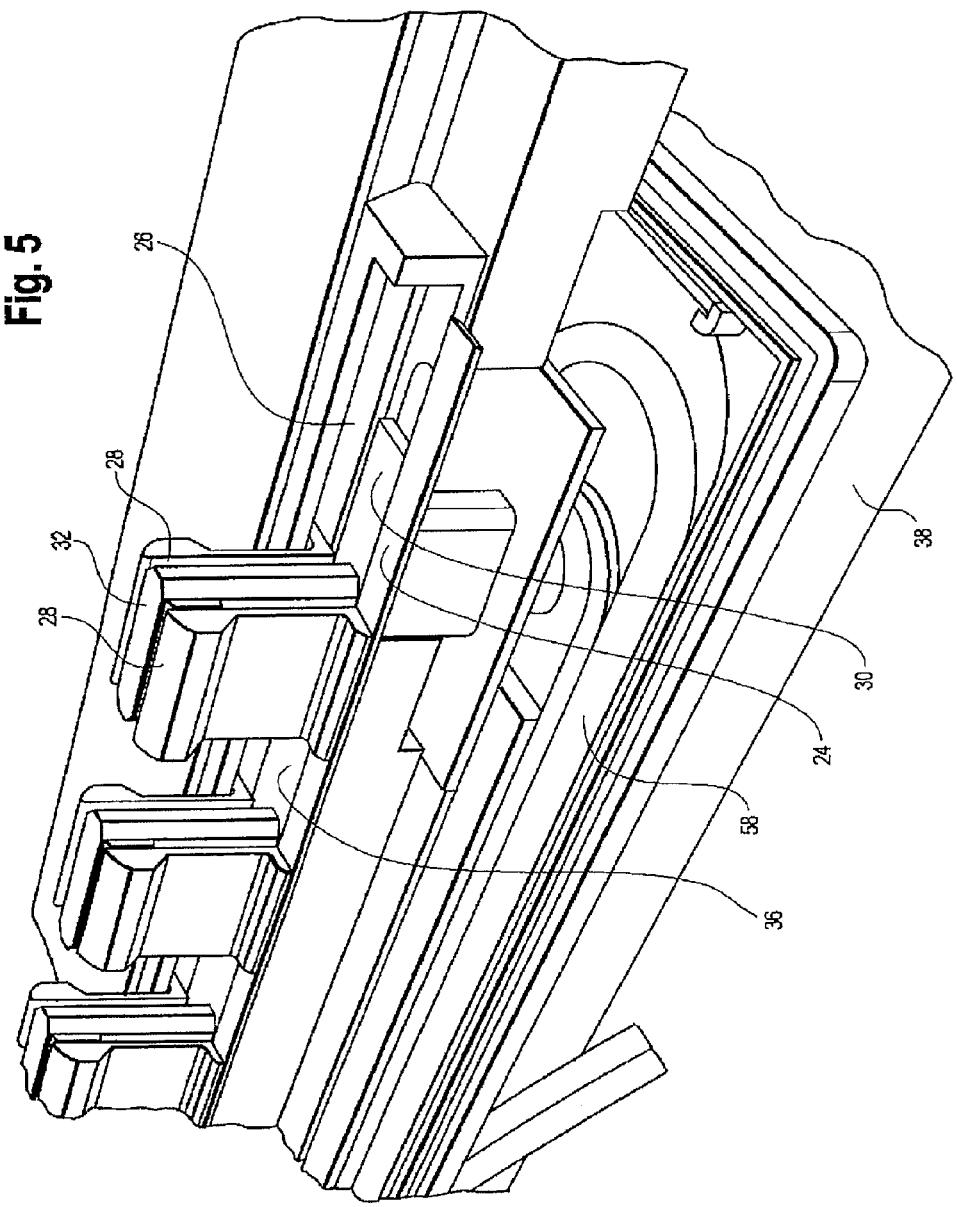

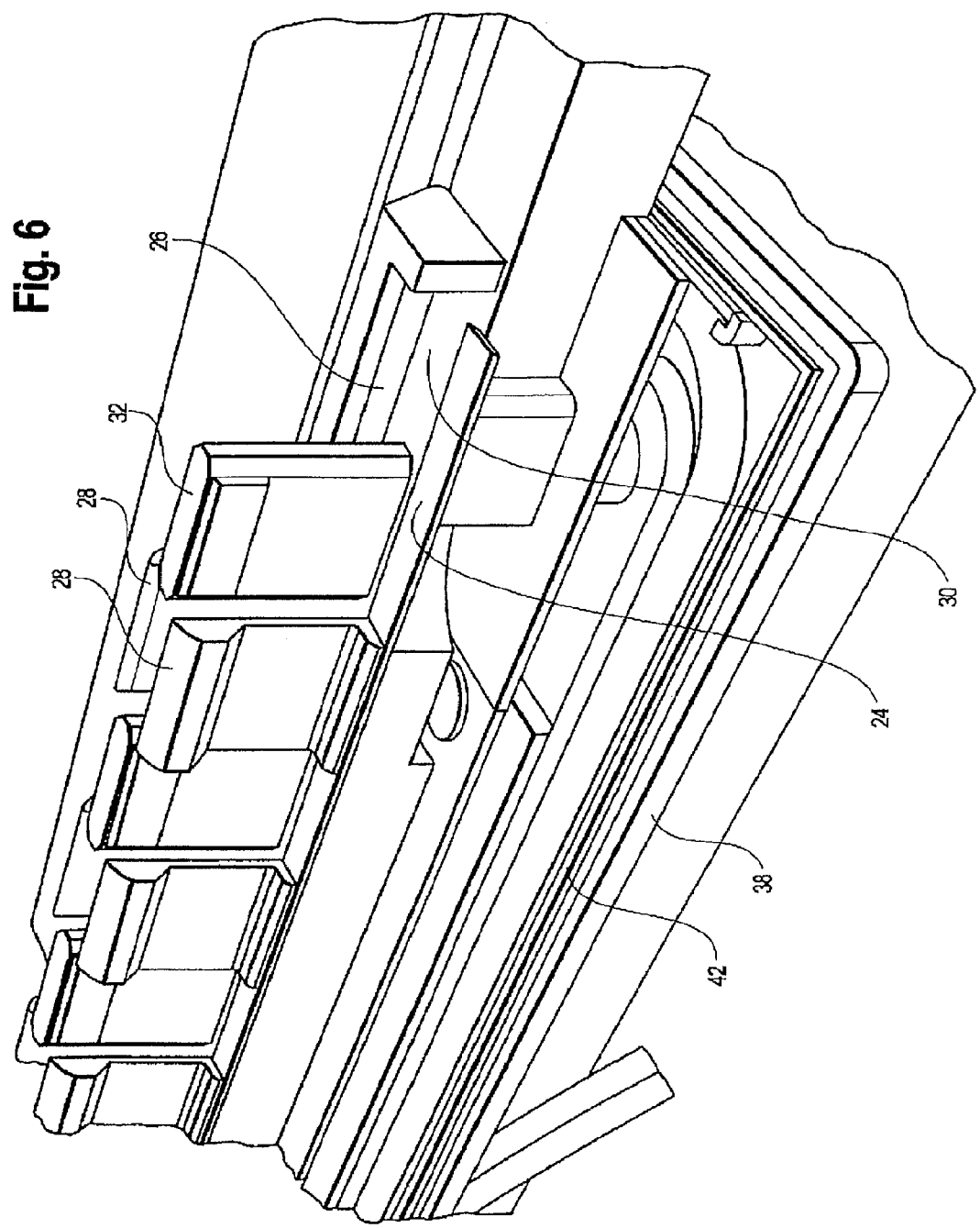

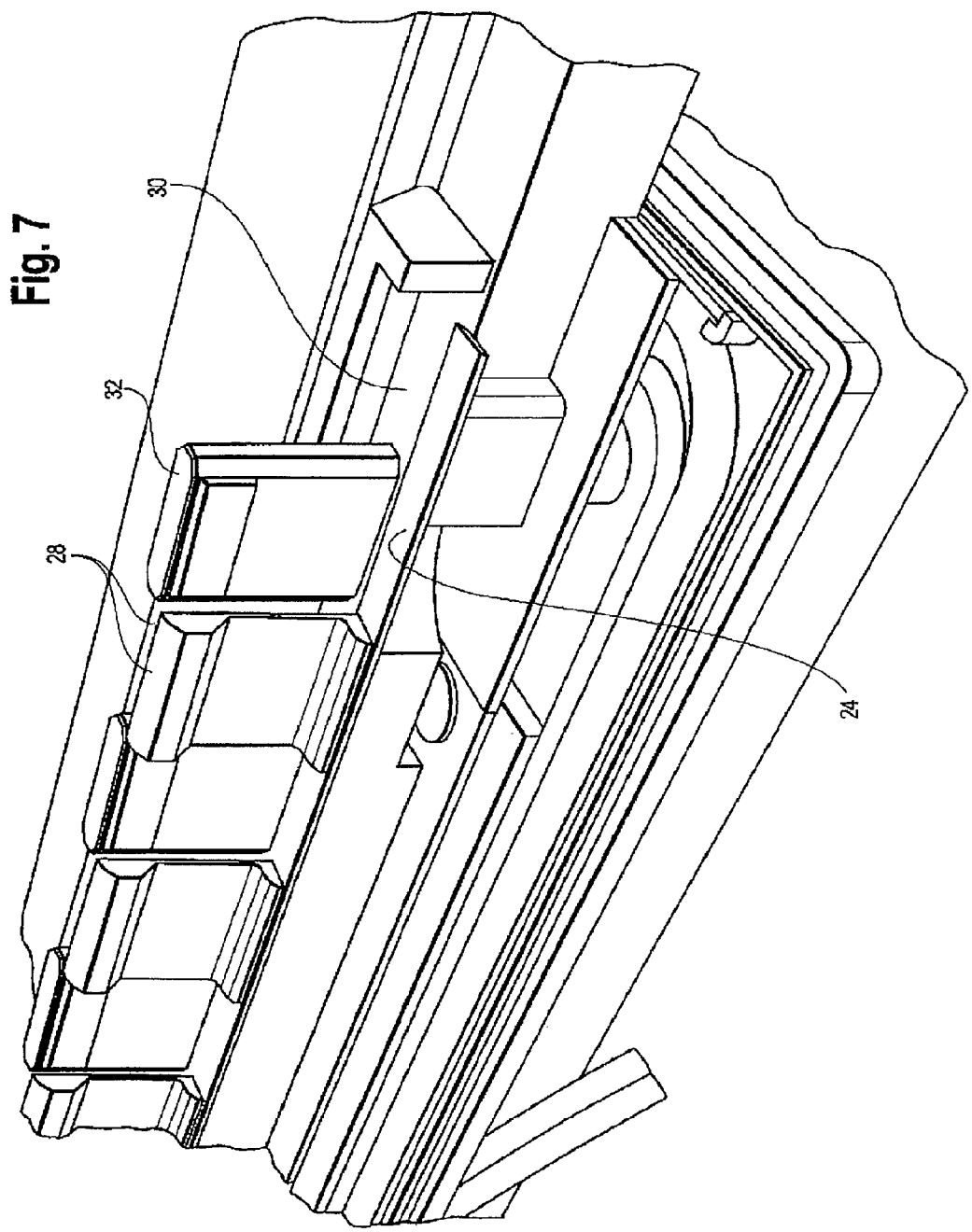

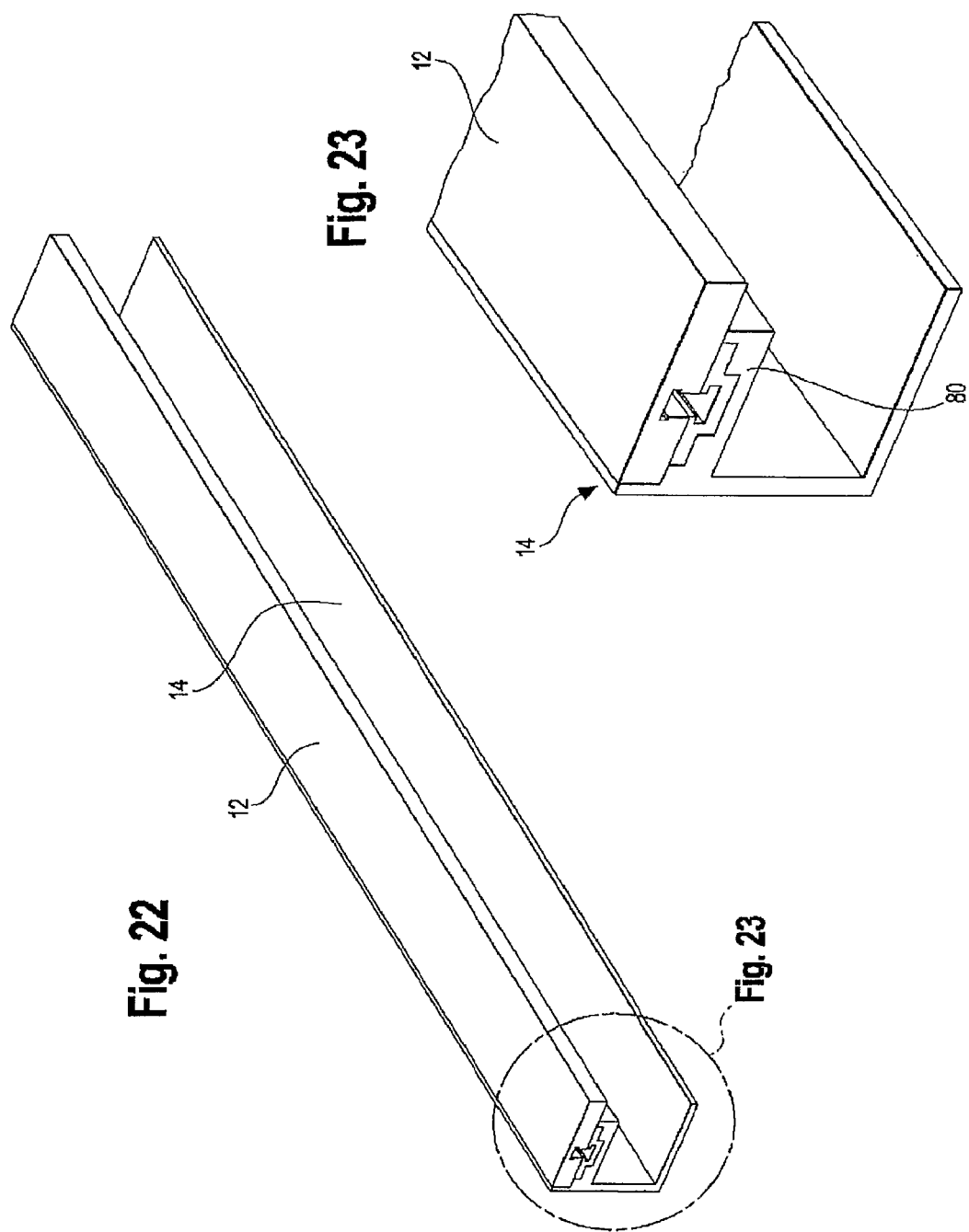

STRIP FASTENER

FIELD OF THE INVENTION

This invention relates to a fastener. In particular, this invention relates to the type of fastener which may be manufactured in various lengths and which is often referred to below as a "strip fastener".

BACKGROUND OF THE INVENTION

Strip fasteners are convenient and effective to fasten panels, doors, windows and other elements and can provide a continuous seal.

Versions of strip fasteners were disclosed in the published specification of International Patent Application No PCT/AU99/00185 and in particular in connection with FIGS. 25 to 39 of that specification. The contents of the International Patent Application are imported herein by reference.

At least in some respects, the present invention may be regarded as a development of the strip fastener disclosed in the International application imported herein.

At least in some embodiments, the present invention deals with material which contracts when activated. Further comments regarding examples of such material are set out below. There are some problems which can be experienced with such material and these problems are also discussed below. The present invention, at least in some embodiments, aims to overcome or alleviate these problems.

SUMMARY OF THE INVENTION

The present invention provides a fastener adapted to releasably fix a first element and a second element, the fastener including:
- a channel having a plurality of spaced lockers, the lockers being movable into the channel; and
- a locking tongue having a plurality of spaced blockers, the tongue being movable within the channel between a locked position in which the blockers prevent movement of the lockers into the channel and an unlocked position in which the lockers are not prevented from moving into the channel.

The first element and the second element may be any suitable element. One example of the first element is a fixed panel and one example of the second element is a removable panel, or closure, such as a door. However, the invention is not limited to these embodiments. The first and second elements may be chosen from a wide range of forms.

The channel may have sides which are not contiguous with a base. In a preferred embodiment, the channel has two opposed walls and a base which is not joined to the sides. Other configurations may be suitable.

Preferably, the channel has the plurality of spaced lockers on each of two strips which together form opposed walls of the channel. In this embodiment, the lockers on each of the two strips are adapted to pivot towards the center of the channel or be maintained by the blockers in the locked position.

The locking tongue is preferably movable longitudinally within the channel. In an especially preferred embodiment, the locking tongue includes a base which forms the base of the channel, being slidable therein.

The blockers are preferably of similar dimension to the lockers. Similarly the spaces between adjacent blockers are preferably the same as or similar to the spaces between the lockers. With this configuration, when the tongue is moved to the unlocking position, the lockers are located adjacent the spaces between the blockers and may be pivoted towards the centre of the channel without restraint by the blockers. When the lockers are encased with the channel and the blocking tongue is moved into place, the parts of this fastener draw together, tensioning the joint.

The lockers and blockers are preferably of metal so as to provide a strong arrangement for high load applications. It is also possible for the lockers to be made of suitable engineering plastic, for lower load requirements. Appropriate material choices for specific applications will be apparent to one skilled in the art.

Preferably, the lockers move pivotally. In one embodiment, where the spaced lockers are on two strips which together form opposed walls of the channel, the lockers move pivotally when tops of the lockers tilt inwardly towards each other, into the channel. In another embodiment, the lockers form parallel walls of the channel and move inwardly towards each other, maintaining their parallel positions.

Preferably, the channel forms part of a flexible assembly. The purpose of this is to allow the fastener to flex so that it can be used to fasten elements which may be curved or otherwise non-linear. To allow flexibility, it is preferred that the lockers, blockers, and the locking tongue have relatively thin sections at their base, to allow vertical flexing to follow, for example, curved sections in a panel.

The fastener of the invention may be attached to the first element by any suitable means. It is particularly preferred that the fastener is retained in a retaining guide in the first element or in a rig attached to the first element, the rig being bonded to the first element, for example. It is preferred that the lockers are adapted to be retained within a locking groove or other suitably shaped profile in the second element. When the fastener is locked, the lockers are engaged with the locking groove and cannot be released while the blockers prevent the lockers from being pivoted into the channel. When the blockers are moved so that they no longer interfere with the lockers and the lockers can move into the channel sufficiently to clear the locking groove, and the second element may be removed from the first element.

It is preferred that the locking tongue is caused to move between the locking position and the unlocking position by material adapted to contract when activated. The material adapted to contract when activated is preferably shape memory alloy strip. Shape memory alloys are known and are usually made predominantly or wholly of titanium and nickel. They may also include other material, such as aluminium, zinc copper, and other similar materials. A shape memory alloy is capable of adopting one shape below a predetermined transition temperature and changing to a second shape once its temperature exceeds the transition temperature. Conversely, when the shape memory alloy cools below the transition temperature, it is capable of adopting the first shape again. In connection with the present invention, the shape memory alloy preferably contracts when heated in situ. Shape memory alloy strip currently available, such as that sold under the name Nitinol, is capable of contracting for many cycles by about 3% when activated by heating.

Activation of the material adapted to contract when activated is preferably achieved through electrical resistance heating, with a wire feed to the assembly. Activation of the shape memory alloy strip can be initiated from a central location, using the wiring system of, for example, an aircraft or automobile. It is also within the scope of this invention that the activation is initiated by remote means, such as a hand held tool operating through the use of any suitable form of energy, including microwave, electro magnetic, magnetic, sonic, infra-red, radio frequency and so on.

The scope of the invention is not necessarily limited to the use of shape memory alloy. Other material may also be useful. Also, while activation may take place through heating, other means of activation may be suitable and are within the scope of this invention.

While other configurations may also be suitable, it is preferred that one shape memory alloy strip is used to move the tongue to the locking position and a second shape memory alloy strip is used to move the tongue to the unlocking position, so that the fastener of the invention is bistable. When two strips are used, the fastener can be designed to remain in either the locked or the unlocked state until the opposing strip is activated.

It may be desirable to link the locking and unlocking strips by a push link or other means, so that there is only a single actuator connection with the mechanism. This can permit the mechanism to be curved, while connected to a straight actuator.

The fastener is preferably a strip form of fastener. Even more preferably, the fastener is made up of modules. For example, the minimum module length may be 400 mm. For this size, the shape memory alloy strip may have an active length of 300 mm and be of strip type 0.2×5 mm in section. Activation would require 24 amps at 13.8 volts for 1 second to heat and this could provide a 17 daN pulling force. Less amps may be required if heating was spread over 3 to 5 seconds.

Modules may be linked together in any desirable way, such as by use of an actuator plate which can attach adjoining modules.

In modular form, it would not be necessary to activate all modules at once. Consequently, a small power supply may be adequate to activate each module length.

In case of high ambient temperature or in an overheat situation, the fastener of the invention may include a failsafe element to ensure the fastener stays in the locked position. For example, the fastener may include an unlock drive pin and in an overheat situation a failsafe element may be able to move up and block the drive pin so that the fastener stays in the locked position.

Preferably, the shape memory alloy actuator is sealed against fluid and dust by a slip seal, which may be positioned in a recess and move back and forth with the locking and unlocking action of the actuator.

It will be appreciated that other actuators, apart from shape memory alloy strip, may be used in connection with the fastener of the invention, such as servomotors and hydraulic cylinders.

Preferably, two position sensors and one temperature sensor are integrated within the fastener to monitor and control mechanism function. They provide the information that either the fastener is in the locked state or that the fastener is in the unlocked state. The temperature sensor is used to measure internal ambient temperature to optimize overall performance and to provide over and under operating temperature threshold shutdown protection. Activation of the over-temperature failsafe mechanism can also be part of this arrangement.

Other advantages and aspects of the present invention will become apparent upon reading the following description of the drawings and the detailed description of a preferred embodiment of the invention.

BRIEF DESCRIPTION OF THE DRAWINGS

FIG. 1 depicts a sectional side elevation of an embodiment of the fastener of the invention in situ, fastening a first element being a removable panel and a second element being a fixed panel, the fastener being in the locked position;

FIG. 2 depicts a plan view of the lockers and blockers of the fastener of FIG. 1, in the locked position;

FIG. 3 corresponds to the embodiment in FIG. 1, except that the fastener is shown in the unlocked position;

FIG. 4 is a plan view of the lockers and blockers in the unlocked position;

FIG. 5 is a perspective view of an end of the fastener in the locked position;

FIG. 6 is a perspective view of the end of the fastener progressing towards the unlocked position;

FIG. 7 is the same view as in FIGS. 5 and 6, but in the fully unlocked position;

FIG. 22 shows assembly of the fastener to a structure; and

FIG. 23 shows a detail from FIG. 22.

DETAILED DESCRIPTION OF THE DRAWINGS

Figure 8:
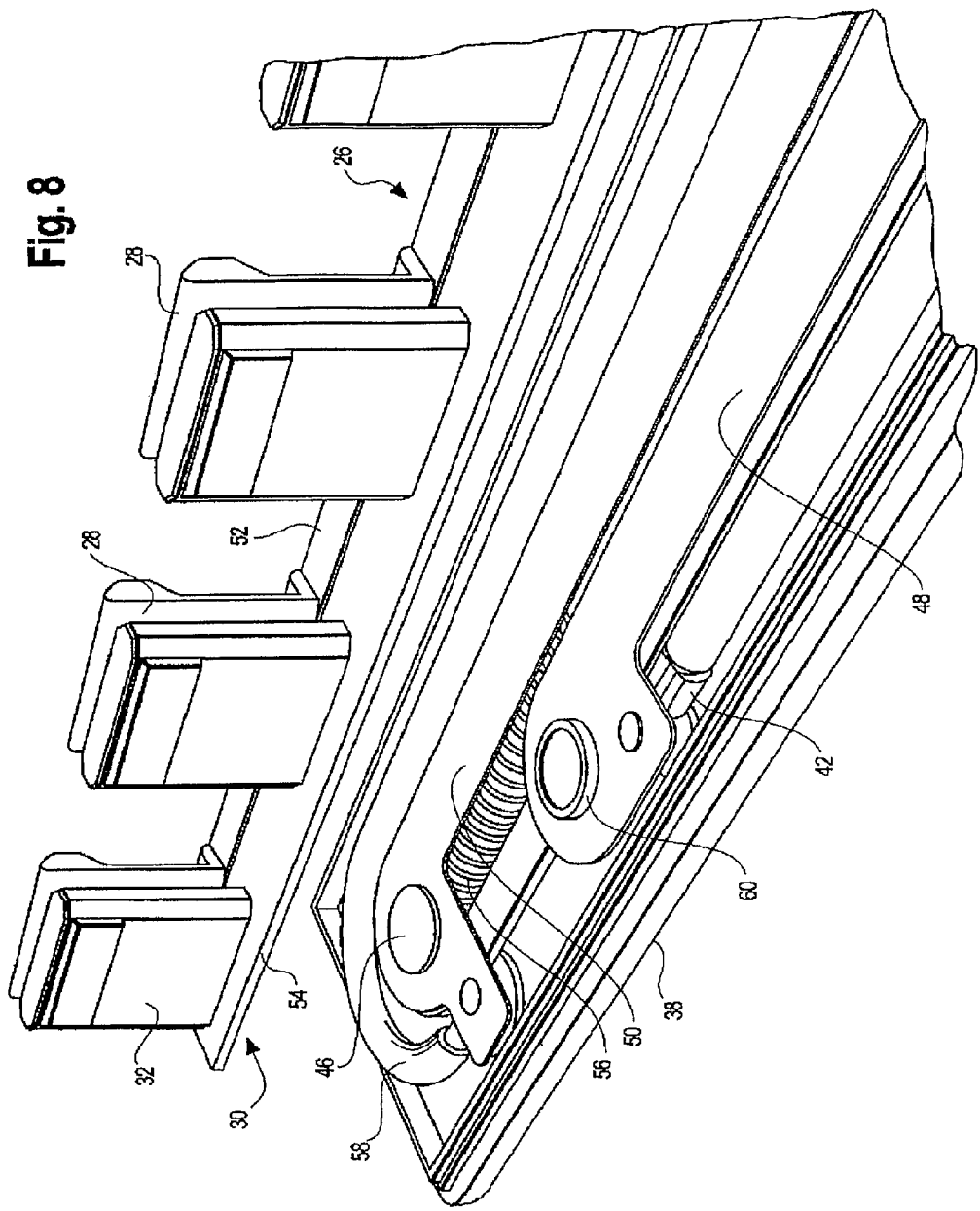
FIG. 8 is a partly exploded view of the embodiment in FIG. 5, showing the locked position, and also showing part of the actuator, but with one strip of lockers omitted for clarity.

In the drawings, fastener 10 (see FIGS. 2 and 4) is shown releasably fixing a removable panel 12 to a fixed panel 14 (see FIGS. 1 and 3).

Retaining guide 18 is formed in rig bracket 16 to retain the elements of fastener 10. Rig bracket 16 is bonded or otherwise affixed to fixed panel 14.

Locking groove 20 is machined in removable panel 12, for engagement with fastener 10. Alignment of removable panel 12 with fixed panel 14 is assisted by tolerance positioning of retaining guide 18 in its seat and locking groove 20 in removable panel 12.

With reference particularly to FIGS. 2, 4, 5 and 6, fastener 10 has a channel 22 formed between two strips 24 and 26 of lockers 28. Channel 22 has a base formed by slidable locking tongue 30. Tongue 30 has blockers 32. Preferably, lockers 28 are at 10 mm pitch (as are blockers 32) and spaces 36 between blockers 32 are large enough to accommodate lockers 28.

When tongue 30 is drawn from the locking position shown in FIG. 5 to the unlocking position in FIG. 6, lockers 28 can pivot inwardly towards the centre of channel 22, as shown in FIG. 7. Comparing this with FIGS. 1 and 3, in the locked position lockers 28 are retained in locking groove 20 by blockers 32 (FIGS. 1 and 2), but can be pivoted inwardly to clear locking groove 20 when blockers 32 are moved out of register with lockers 28 (FIGS. 3 and 4) so as to unfasten panel 12 from panel 14.

Items 38, 40, 41 and 44 are described in connection with FIGS. 8 to 12, below.

FIGS. 8 to 12 show the elements of an embodiment of actuator for fastener 10. The actuator elements are contained within actuator casing 38 which, in this embodiment, is made of aluminium. Plastic injection moulded liner 42 is used to support and insulate the electronics and shape memory alloy strips or ribbons of the actuator.

Figure 12:
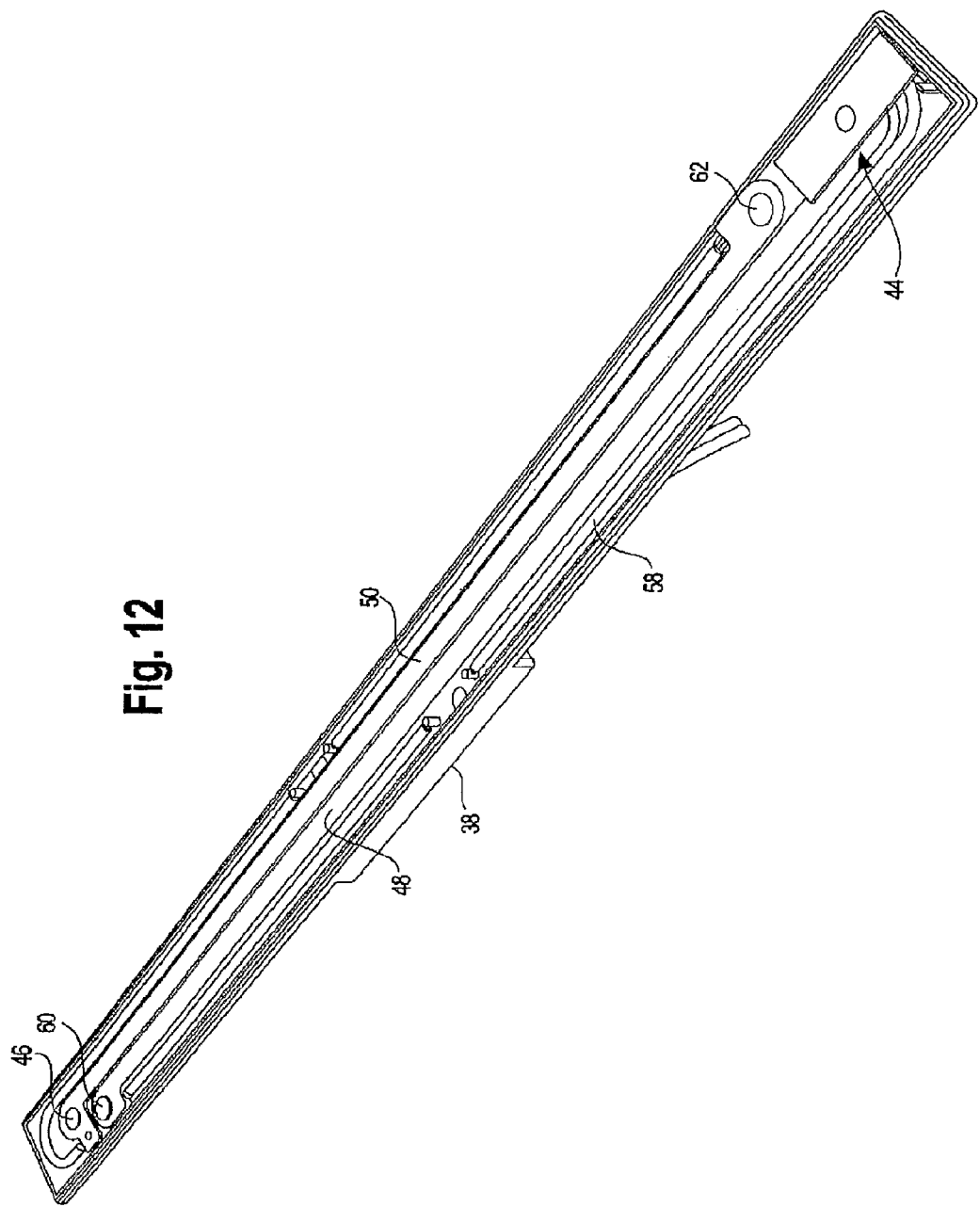
FIG. 12 shows the actuator in the unlocked position.

The actuator illustrated is bi-stable and has two shape memory alloy (SMA) ribbons 48 and 50. SMA ribbon 48 is used to unlock fastener 10, while SMA ribbon 50 is used to lock fastener 10. Fastener 10 can remain in either the locked or unlocked state until the opposing SMA ribbon is activated. The SMA elements are internally linked by an SMA push link 41 so that there is only one actuation connection mechanism. This allows the mechanism to be curved while linked to a straight actuator. SMA ribbon 48 is fixed at end 60 (FIGS. 8 to 10), while SMA ribbon 50 is fixed at end 62 (FIG. 12).

Where fastener 10 is provided in modules (refer below), in the bi-stable embodiment it is not necessary to activate all modules at once. A small power supply may be used to activate each module length sequentially.

Figure 9:
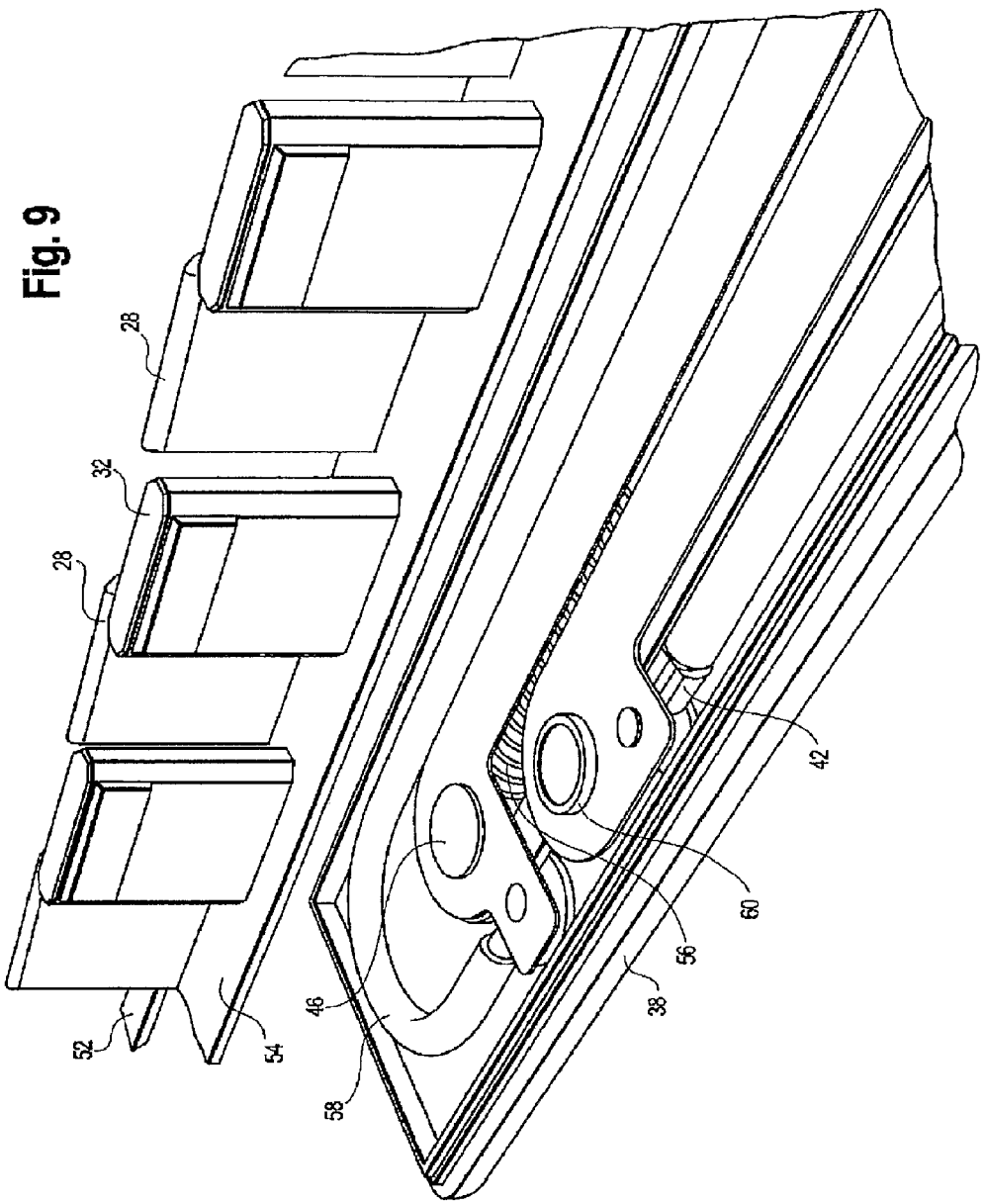
FIG. 9 is a view corresponding to that in FIG. 8, for comparison with that in FIG. 6.
Figure 10:
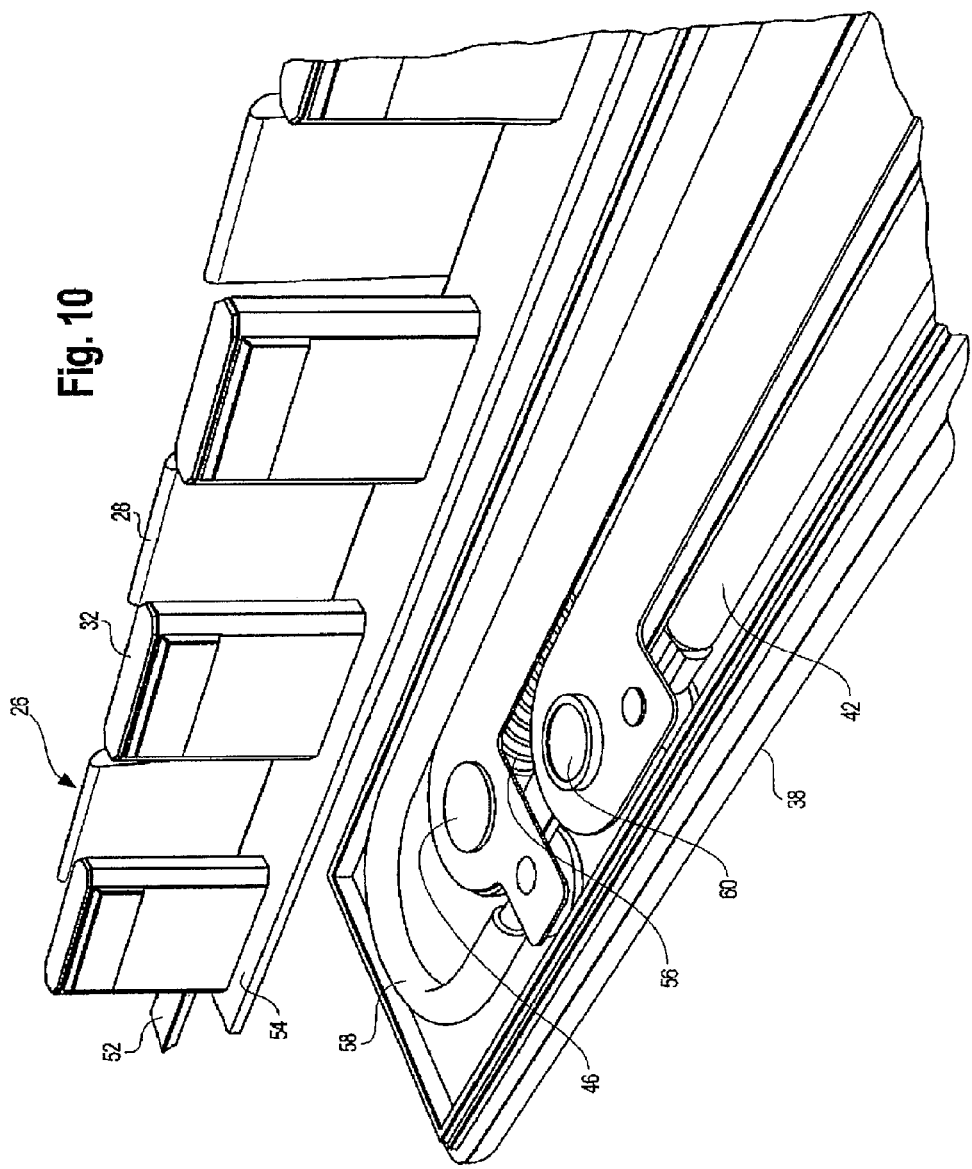
FIG. 10 shows the embodiment of FIGS. 8 and 9, corresponding to FIG. 7.
Figure 11:
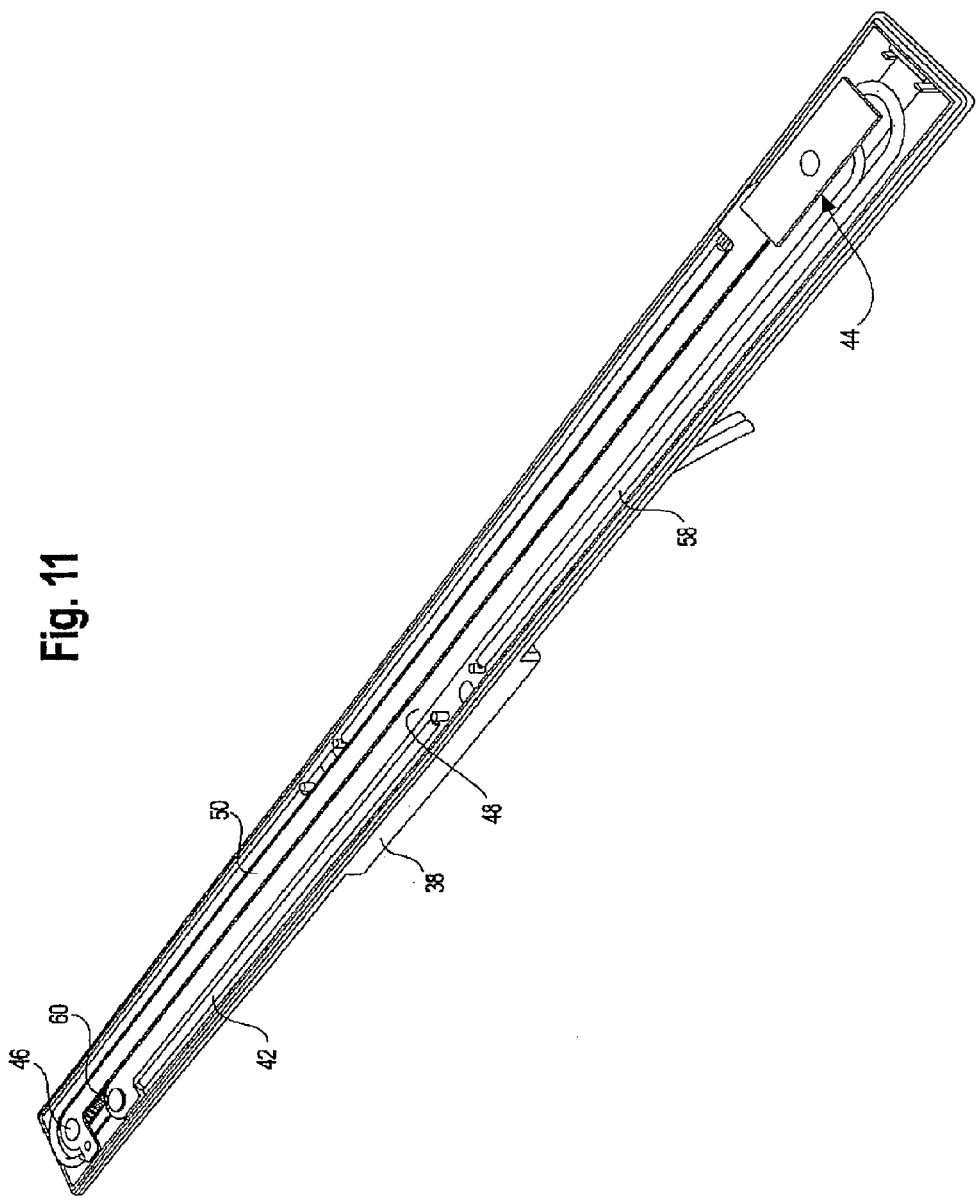
FIG. 11 is a perspective view of the actuator in the previous Figures, in the locked position.

As can be seen in FIGS. 8, 9 and 10, strip 24 of lockers 28 has a bottom joining section 52. Similarly, tongue 30 has a bottom joining section 54 supporting blockers 32. Both joining sections 52 and 54 are in this embodiment relatively thin, so that they allow vertical flex to follow, for example, curved sections in a panel.

Locker strips 24 and 26 and tongue 30 may both be made of metal to provide a very strong joint for high load applications. Alternately, an engineering plastic may be used for locker strips 24 and 26 for lower load requirements. Engineering analysis can establish appropriate material choices for a specific application.

The actuator elements also include unlock drive pin 44 (position indicated in FIGS. 11 and 12) and lock drive pin 46.

Also visible in FIGS. 8 to 10 is overstress spring 56 and power conductor loop 58.

As can be seen from the progression in FIGS. 8 through 9 and 10, as locking tongue 30 is moved out of register with locker strip 24 (and locker strip 26 not shown) blockers 32 clear lockers 28. When lockers 28 are completely clear of blockers 32, lockers 28 pivot or tilt towards each other. FIG. 10 illustrates this for lockers 28 on strip 24. Lockers 28 on strip 26 (not shown) tilt towards lockers 28 on strip 24. In this configuration, fastener 10 is no longer engaged in locking groove 20 (refer FIG. 3) and removable panel or door 12 is released from fixed panel 14.

Figure 13:
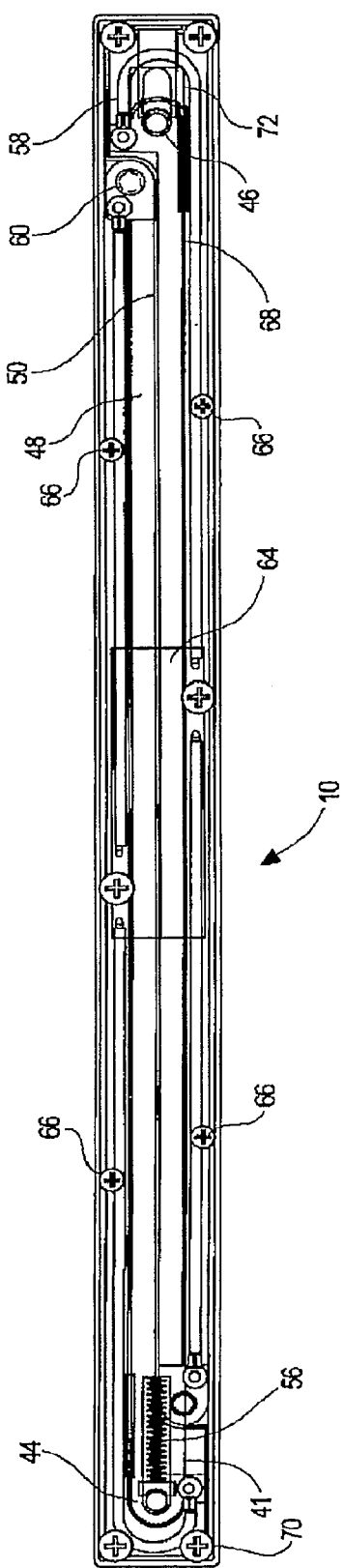
FIG. 13 is a plan view of a second embodiment of actuator suitable for the fastener of the invention.
Figure 14:
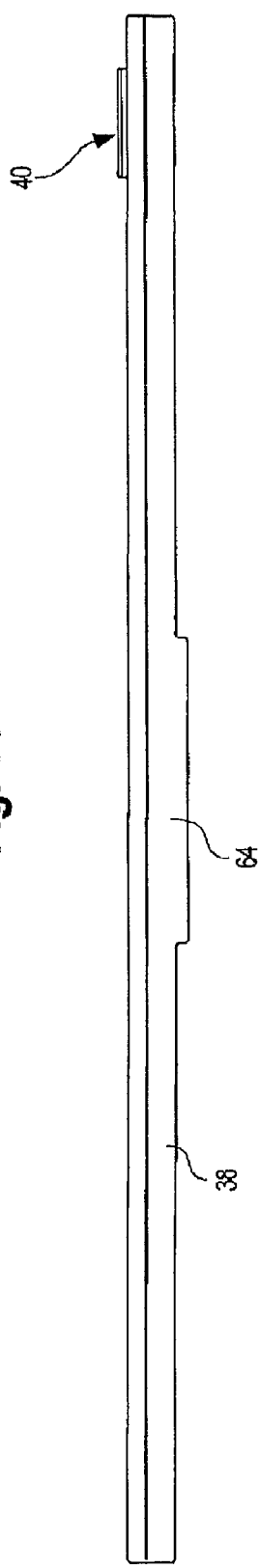
FIG. 14 is a side elevation of the actuator of FIG. 13.

Reference is now made to the embodiment in FIGS. 13 and 14. The same numbers will be used to refer to the same or equivalent parts in these Figures as used above.

Actuator casing 38 includes a well 64 (FIG. 14) to accommodate electronics for the actuator elements. In the embodiment shown, fastener 10 represents a module with a minimum module length of 400 mm. SMA ribbons 48 and 50 have an active length of 300 mm and are of the ribbon type, being 0.2 mm×5 mm in section. Activation requires 24 amps at 13.8 volts for 1 second to heat and can provide a 17 daN pulling force. Less amps would be required if heating was carried out over 3 to 5 seconds.

Shown in FIG. 13 are four actuator casing screws 66 and SMA guide ribs 68. The actuator assembly includes six actuator position fixing screws 70, only one of which is labelled, for clarity.

SMA push link 41, which is also shown in FIG. 1, is indicated in FIG. 13. SMA push link 41 links the SMA elements so that there is only one actuation connection with the mechanism and so that the mechanism can be curved.

Included in FIG. 13 is failsafe element 72. This ensures that SMA locking ribbon 50 stays in the locked mode in overheat conditions. Failsafe element 72 is positioned underneath drive pin 46 and, in overheat conditions, failsafe element 72 moves up and blocks drive pin 46 in the locked position.

Shown in FIG. 14 is slip seal 40. This is also shown in FIG. 1. Slip seal 40 is used to seal the actuator against fluid and dust. Slip seal 40 is part of the actuator assembly and provides the linkage to drive pin 46. Slip seal 40 is positioned in a recess (not shown) in the aluminium support bracket and moves back and forth with the locking and unlocking action of the actuator.

Figure 15:
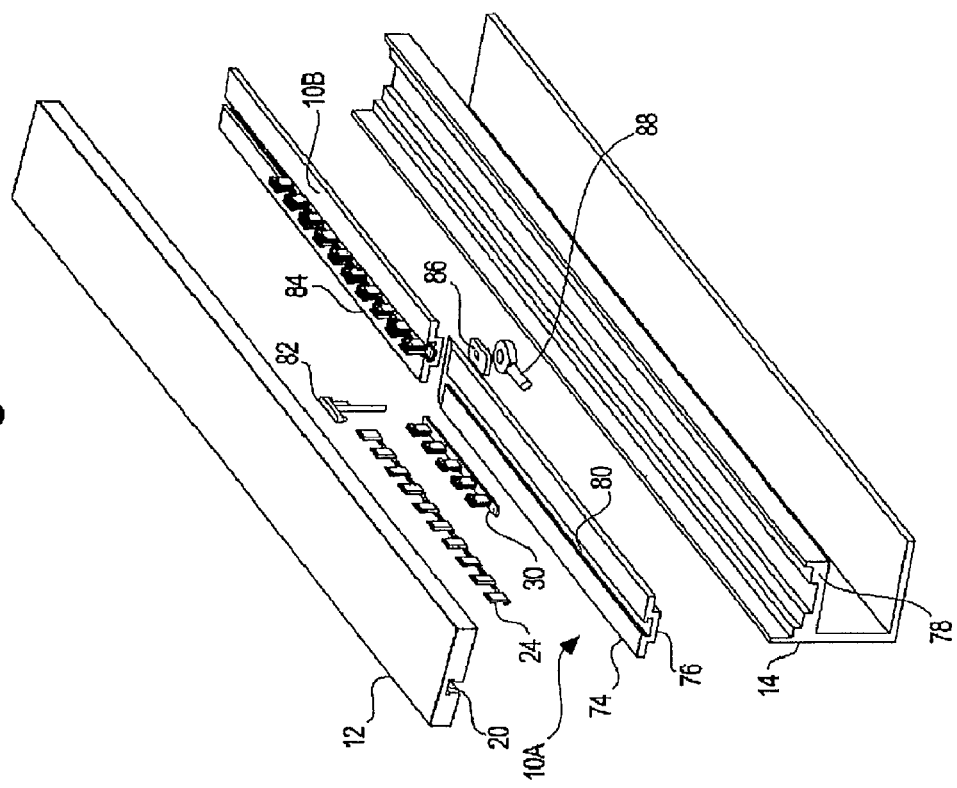
FIG. 15 is an exploded view of an embodiment of modules of the fastener, showing architecture.

FIG. 15 is an exploded view of an embodiment of modules of fastener 10 and shows architecture. As can be seen from FIG. 15, removable panel 12 has formed in it locking groove 20. Two modules of fastener 10A and 10B are shown. It is to be understood that several fasteners 10 may be linked together.

In this embodiment, fixed panel 14 is provided with frame extension 74, instead of rig bracket 16. Frame extension 74 includes dove-tailed protrusion 76 to fit into complementary groove 78 in fixed panel 14. Frame extension 74 includes channel 80 for locking tongue 30 with blockers 32 and strips 24 and 26 having lockers 28 (only one strip, 24, is shown for fastener 10A for clarity). Strips 24 and 26 and locking tongue 30 are shown installed in channel 80 in fastener 10B.

Also illustrated in FIG. 15 are actuator slide 82, actuator plate 84, key plate 86 and actuator linkage 88. Refer to further discussion, below.

Figure 16:
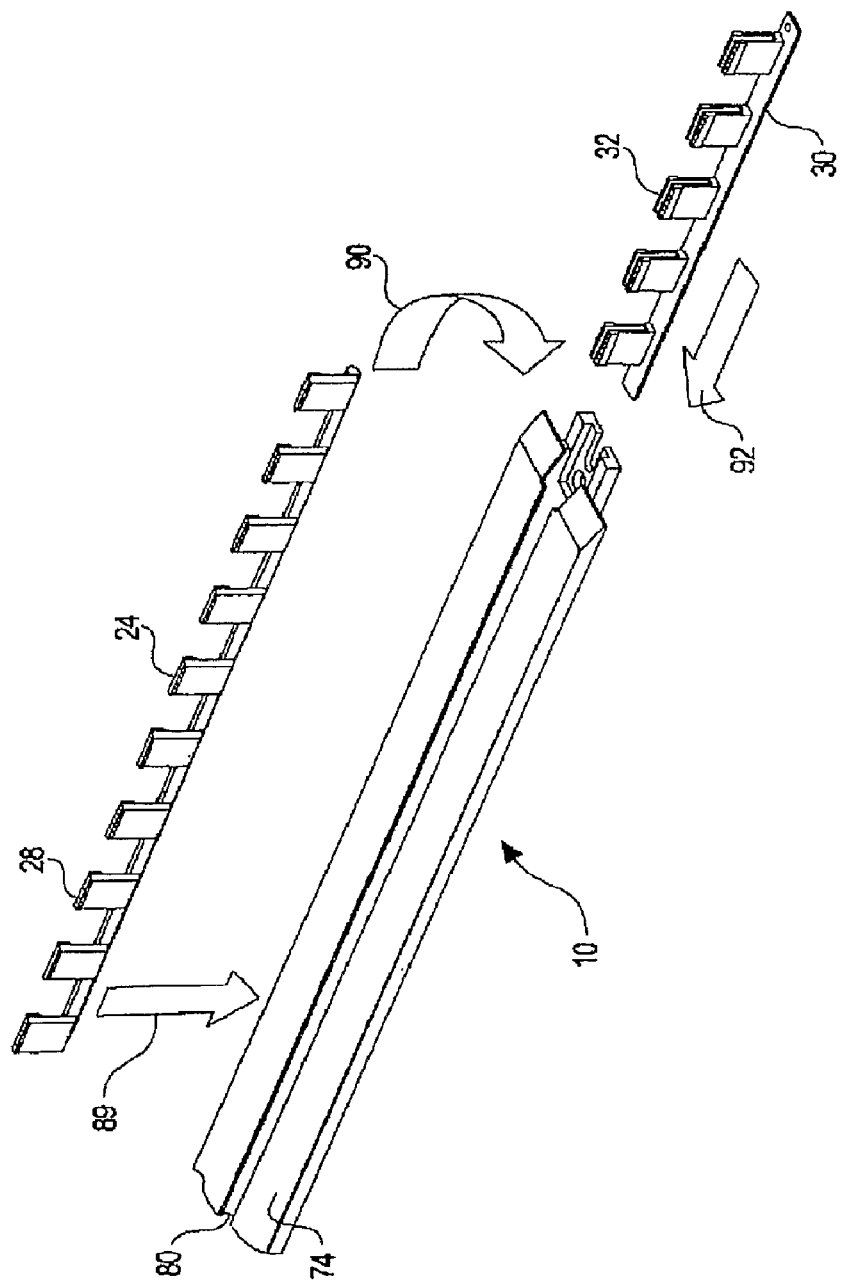
FIG. 16 is a detail from FIG. 15, illustrating how lockers and blockers can be assembled in a module of the fastener.

An embodiment of mode of assembly of a modular fastener 10 is shown in FIG. 16. Frame extension 74 is shown with channel 80. Each strip 24 or 26 (24 is shown) with lockers 28 can be assembled into channel 80 from above as shown by arrow 89 or can be slid in from an end as indicated by arrow 90. Tongue 30 with blockers 32 may then be slid in from the end as indicated by arrow 92.

Figure 17:
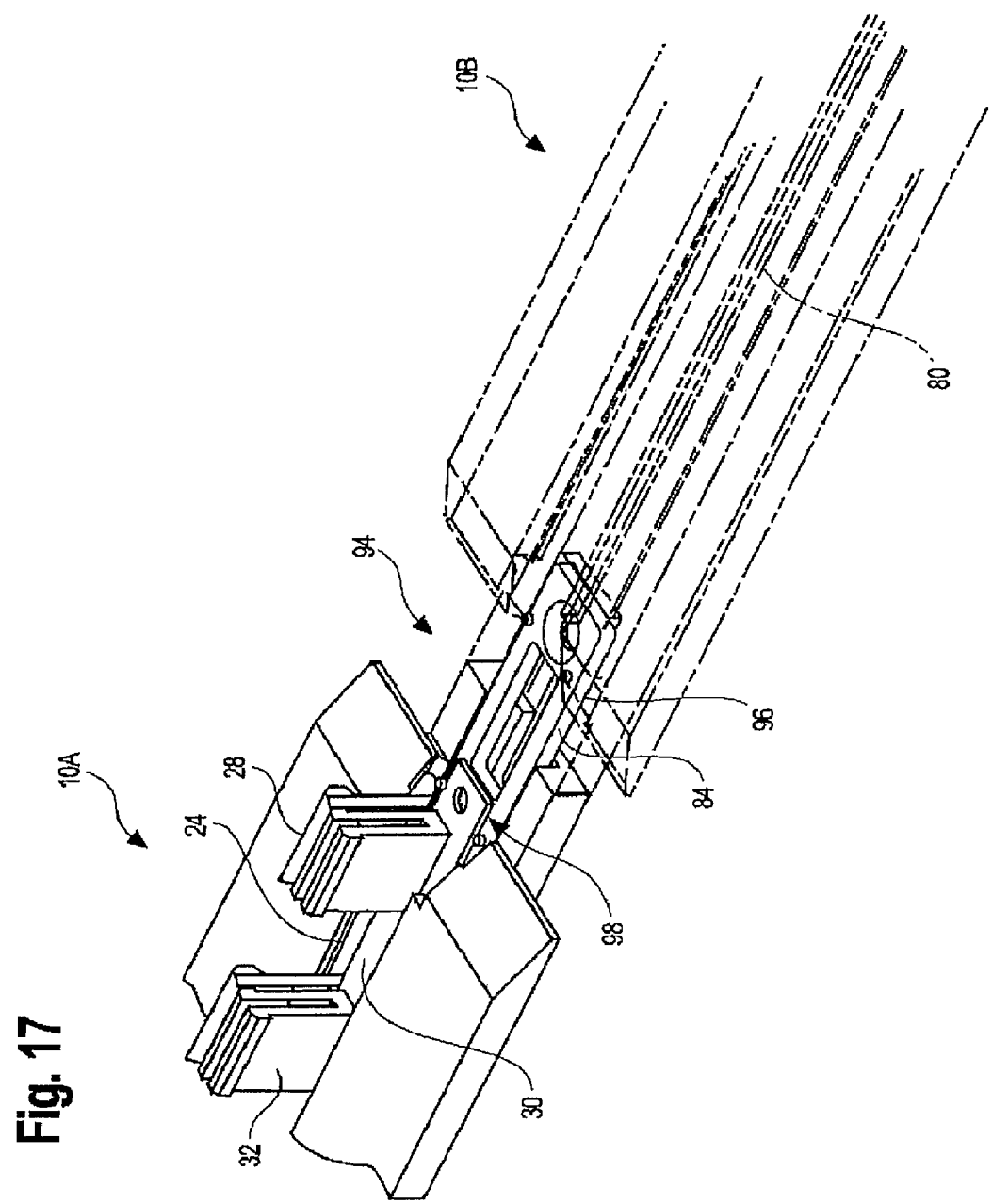
FIG. 17 shows a node point between two fastener modules.

FIG. 17 shows how to chain one fastener 10A to a second fastener 10B at a node point 94. FIG. 17 shows actuator plate 84 as ready to be screwed into channel 80 (actuator plate 84 is also shown in FIG. 15). Actuator plate 84 includes a detail indicated at 96, to key actuator plate 84 to channel 80. Actuator plate 84 also includes details, one of which is indicated at 98, in order to keep lockers 28 in place.

During assembly, tongue 30 and strips 24 and 26 (only one of which is shown in FIG. 17) are over traveled in order to assemble actuator plate 84. Actuator plate 84 is screwed into channel 80. Tongue 30 and strips 24 and 26 are then pushed back to their correct position.

Figure 18:
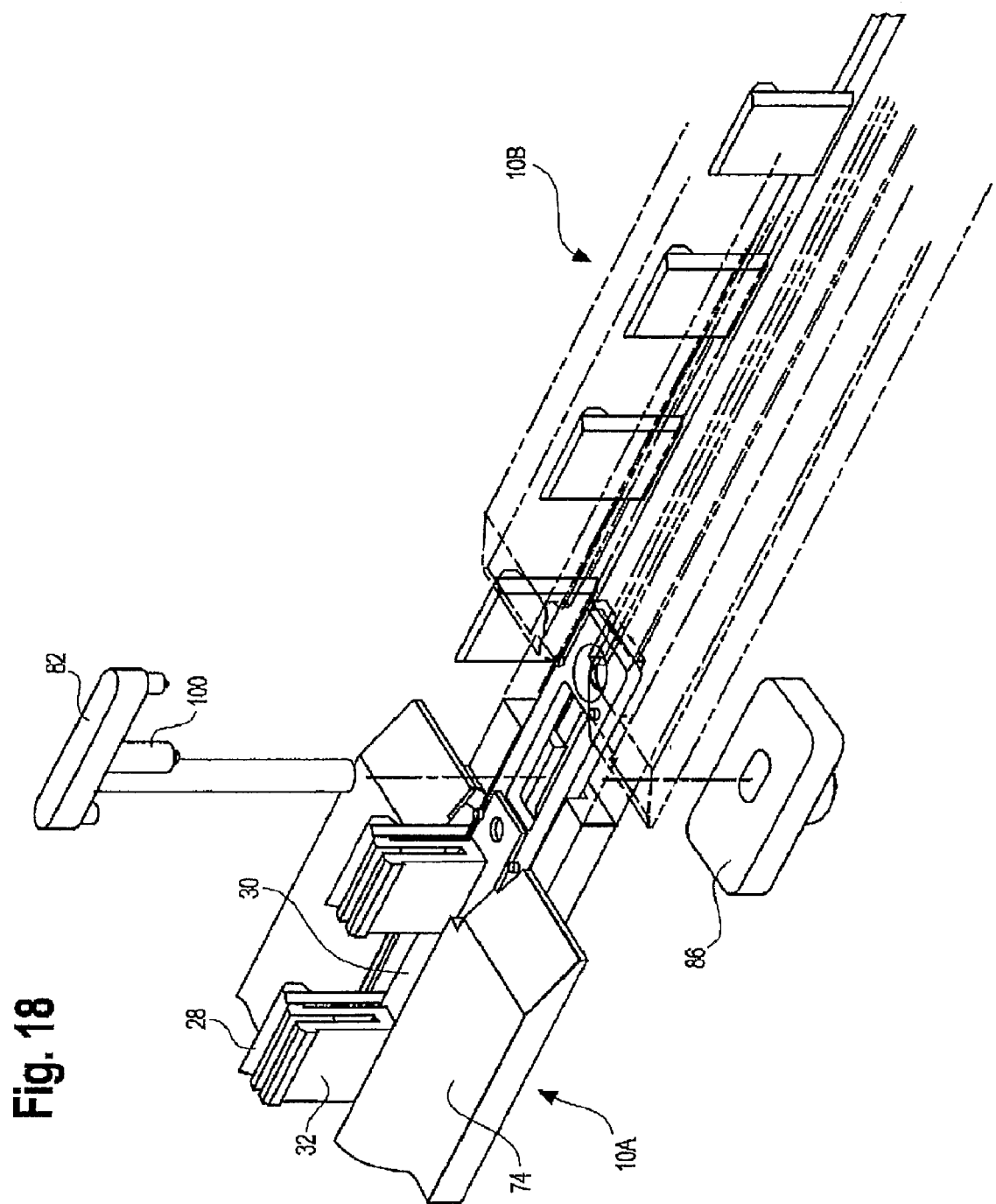
FIG. 18 further details of the linking of modules.

Turning now to FIG. 18, this shows the use of actuator slide 82 and keeper 86 in joining modules of fasteners 10A and 10B. Actuator slide 82 keys into tongue 30 and into keeper 86. Shoulder 100 provides a stop to keeper 86 to eliminate binding.

Keeper 86 is coated with Teflon or is made from a die cut Teflon pad.

Figure 19:
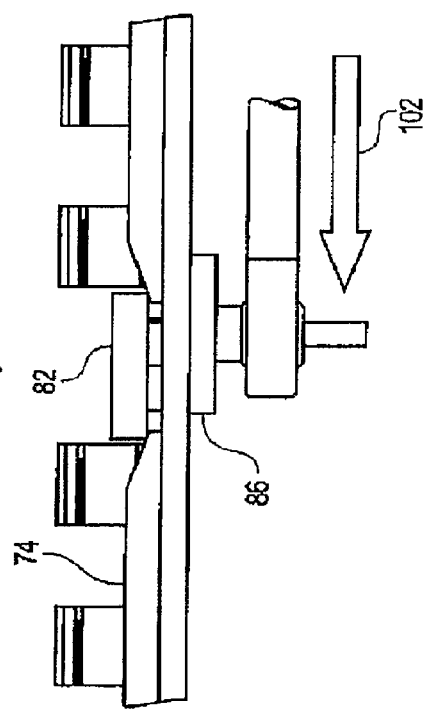
FIG. 19 shows in side elevation (locked position) how actuators can be linked between modules.
Figure 20:
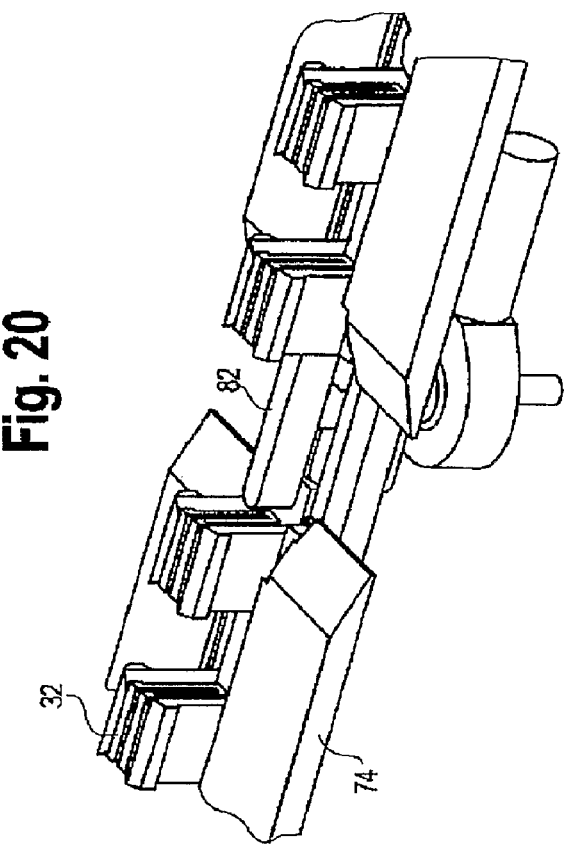
FIG. 20 is a perspective view of FIG. 19.

FIGS. 19 and 20 show actuator slide 82 after insertion into keeper 86, in the locked position. As already mentioned, keeper 86 is coated with or made from Teflon. This reduces friction between keeper 86 and extension 74. Arrow 102 indicates direction of movement of tongue 30 by the actuator.

Figure 21:
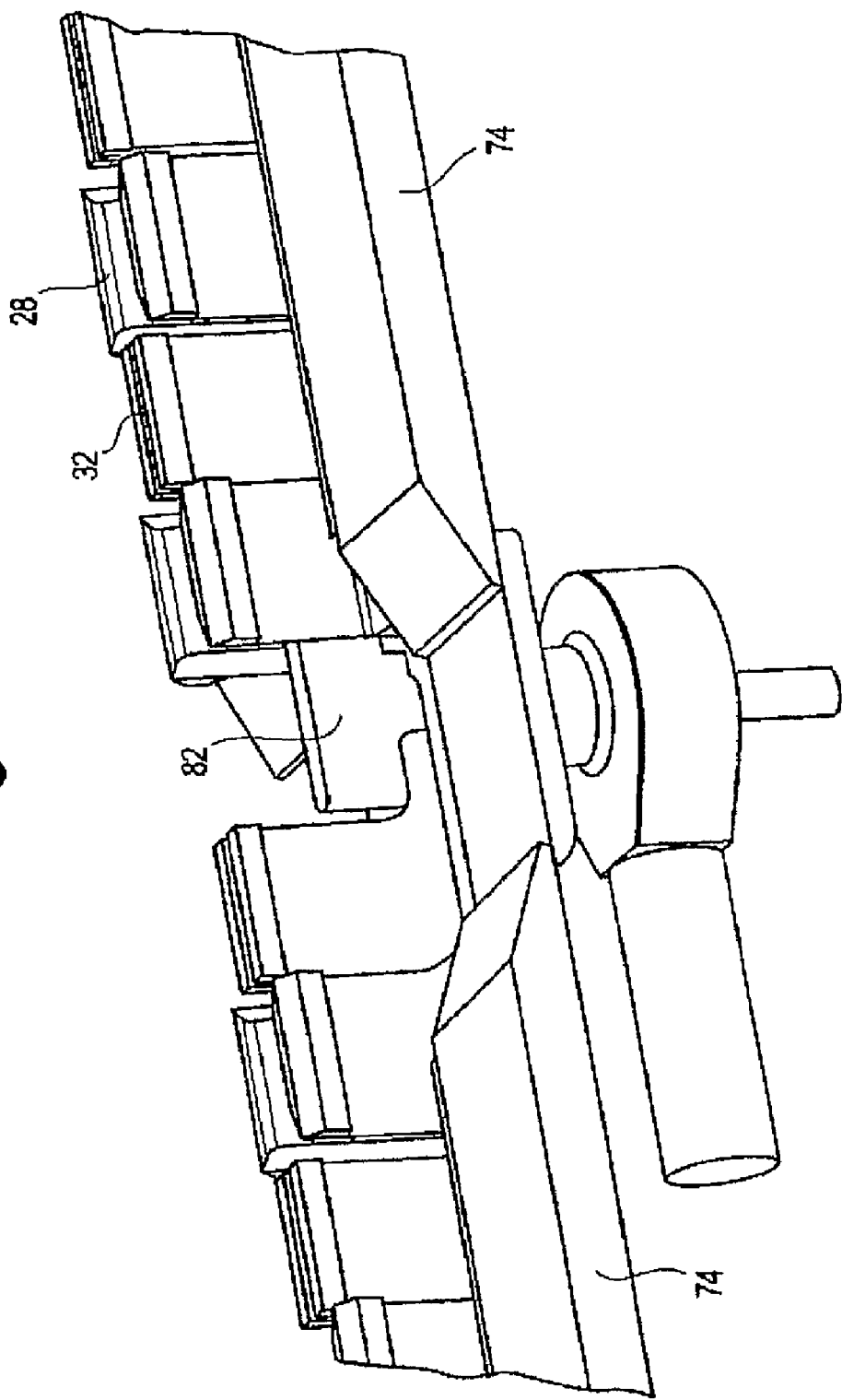
FIG. 21 shows detail of an actuator linkage, in the unlocked position.

FIG. 21 corresponds to the arrangement in FIGS. 19 and 20, but illustrates the unlocked position.

FIG. 22 shows the system assembled. Removable panel 12 is assembled to fixed panel 14 by means of fastener 10, which has been omitted from FIGS. 22 and 23 for clarity. In this embodiment, there is an epoxy interface between extension 74 and groove 78 on fixed panel 14. The epoxy interface can extend to the side flanges indicated, so that a significant surface area is available. Use of the epoxy interface can ensure a flush mount, because tolerances can be taken up.

The description above relates to preferred embodiments of the present invention and is given by way of illustration. Changes, modifications and variations may be made without departing from the spirit and scope of the present invention.

Throughout the specification and claims the word "comprise" and its derivatives is intended to have an inclusive rather than exclusive meaning unless the context requires otherwise.

INDUSTRIAL APPLICABILITY

As will be readily appreciated by those skilled in the various arts, the invention disclosed herein is not limited to the examples set out and has wide application in many areas. The invention represents a significant advance in the art of securing and releasing, particularly in connection with strip fasteners.

What is claimed is:

1. A fastener adapted to releasably fix a first element and a second element, the fastener including:

a longitudinal channel having a plurality of longitudinally spaced lockers forming opposed walls of the channel, the lockers being movable into the channel, the channel having a base;

a locking tongue having a plurality of spaced blockers, the tongue being movable longitudinally within the channel between a locked position in which the blockers prevent movement of the lockers into the channel and an unlocked position in which the lockers are not prevented from moving into the channel; and an actuation means causing said locking tongue to move between the locked position and unlocked position.

2. The fastener of claim 1, wherein the plurality of spaced lockers are on each of two strips which together form opposed walls of the channel; the spaced lockers forming opposed walls of the channel are on two strips and the spaced lockers are adapted to move into the channel by pivoting.

3. The fastener of claim 1, wherein the locking tongue is slidable along the base of the channel.

4. The fastener of claim 1, wherein the blockers and lockers are of similar dimension.

5. The fastener of claim 4, wherein spaces between the blockers are of similar dimension to spaces between the lockers.

6. The fastener of claim 1, which forms part of a flexible assembly.

7. The fastener of claim 1, wherein the actuation means is chosen from a solenoid, an electric motor, hydraulics, and material adapted to contract when activated.

* * * * *